United States Patent
Dunkle et al.

(10) Patent No.: US 7,134,691 B2
(45) Date of Patent: Nov. 14, 2006

(54) AIR BAG CUSHION INCLUDING BREAK-AWAY TETHERS

(75) Inventors: Stephanie L Dunkle, Springboro, OH (US); Sonya Ann Lyons, Huber Heights, OH (US); Laura Adelle Hawthorn, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 597 days.

(21) Appl. No.: 10/150,565

(22) Filed: May 17, 2002

(65) Prior Publication Data

US 2002/0175511 A1 Nov. 28, 2002

Related U.S. Application Data

(60) Provisional application No. 60/293,022, filed on May 23, 2001.

(51) Int. Cl.
*B60R 21/205* (2006.01)
*B60R 21/233* (2006.01)

(52) U.S. Cl. .................................. 280/743.2; 280/732

(58) Field of Classification Search ............. 280/743.2, 280/729, 732
See application file for complete search history.

(56) References Cited

U.S. PATENT DOCUMENTS

| | | | |
|---|---|---|---|
| 3,473,824 A | 10/1969 | Carey et al. ................ 280/150 |
| 3,586,347 A | 6/1971 | Carey et al. ................ 280/150 |
| 3,879,056 A * | 4/1975 | Kawashima et al. ...... 280/743.2 |
| 3,879,057 A * | 4/1975 | Kawashima et al. ...... 280/743.2 |
| 4,966,389 A * | 10/1990 | Takada ..................... 280/743.2 |
| 5,044,663 A * | 9/1991 | Seizert .................... 280/730.1 |
| 5,306,043 A | 4/1994 | Mihm et al. ................ 280/732 |
| 5,308,113 A * | 5/1994 | Moriset ................... 280/743.2 |
| 5,358,273 A * | 10/1994 | Onishi et al. ............. 280/743.1 |
| 5,362,101 A * | 11/1994 | Sugiura et al. .......... 280/743.2 |
| 5,380,038 A | 1/1995 | Hawthorn et al. .......... 280/730 |
| 5,395,134 A | 3/1995 | Gunn et al. ................ 280/743 |
| 5,489,119 A | 2/1996 | Prescaro et al. ......... 280/743.2 |
| 5,513,877 A | 5/1996 | Mac Brien et al. ......... 280/732 |
| 5,676,395 A | 10/1997 | Oe et al. ................. 280/730.2 |
| 5,746,447 A | 5/1998 | Dyer et al. .............. 280/743.2 |
| 5,945,184 A | 8/1999 | Nagata et al. ............. 428/35.2 |
| 5,997,037 A * | 12/1999 | Hill et al. ............... 280/743.2 |
| 6,073,959 A | 6/2000 | Heinz et al. ............... 280/729 |
| 6,155,595 A * | 12/2000 | Schultz ..................... 280/729 |
| 6,454,300 B1 | 9/2002 | Dunkle et al. |

FOREIGN PATENT DOCUMENTS

JP 2000206203 * 1/2002

* cited by examiner

*Primary Examiner*—Son T. Nguyen
(74) *Attorney, Agent, or Firm*—Jimmy L. Funke

(57) ABSTRACT

An automotive air bag assembly including a tethering element providing shape definition across the air bag. The tethering element may be seamed to itself or to other tethering elements by an attachment seam to reduce the effective operative length of the tethering element and to move the axis of rotation for the air bag rearward. The attachment seam is adapted to separate upon development of adequate pressures within the air bag.

16 Claims, 7 Drawing Sheets

AIR BAG CUSHION INCLUDING BREAK-AWAY TETHERS

CROSS REFERENCE TO RELATED APPLICATIONS

This application claims priority from Provisional Application No. 60/293,022 having a filing date of May 23, 2001 the contents of which are incorporated by reference herein in their entirety.

TECHNICAL FIELD

This invention relates to an air bag assembly, and more particularly to an inflatable air bag cushion including tethering restraints of variable operative length. The tethering restraints are normally held in a shortened operative condition by break-away seams which are released upon tension exceeding a certain level such that the tethering elements are extended to an increased operative length as inflation of the air bag cushion proceeds.

BACKGROUND OF THE INVENTION

It is well known to provide an air bag assembly including an inflatable air bag cushion for protecting the occupant of a transportation vehicle. In an automotive vehicle such air bag assemblies are typically located within the hub of the steering wheel and in a recess in the vehicle instrument panel for protection of the vehicle occupants seated in opposing relation to such assemblies. Additional air bag assemblies may be located within the seats and/or door panels for protection of the occupants during a side impact event. It is also known to utilize inflatable curtain-like structures for deployment from the structural pillars or roofline of the motor vehicle so as to promote restraint and protection of the vehicle occupant during a roll-over event.

Air bag assemblies typically include an inflatable cushion in fluid communication with a gas emitting inflator. Upon sensing predetermined vehicle conditions, such as a certain level of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. As inflation gas enters the air bag cushion the pressure within the cushion is increased. As the occupant comes into contact with the expanded air bag cushion, the inflator gas is forced out of the cushion thereby dissipating the kinetic energy of the occupant achieving a so-called "ride down" effect.

Traditional air bag cushions tend to project outwardly away from their storage positions in a substantially straight line during the initial stages of inflation. In a so called "top mount" or "mid mount" design, this directional projection may cause the cushion to first travel in a generally upward direction away from the air bag exit opening and against the windshield. After this initial outward projection during the latter stages of inflation such cushions assume their final inflated design profile causing them to rotate downwardly in covering relation to portions of the instrument panel below the air bag exit opening.

In order to provide additional control over the inflation characteristics of the air bag cushion it has been suggested to utilize tethering elements in the form of straps or webs extending between surfaces of the air bag cushion. These straps or webs may be released from a first restrained operative length to a second extended operative length as the depth of the air bag cushion is increased. A system incorporating such extensible tethering straps is illustrated and described in U.S. Pat. No. 5,489,119 to Prescaro et al. the contents of which are incorporated by reference as is fully set forth herein.

SUMMARY OF THE INVENTION

The present invention provides advantages and alternatives over the prior art by providing an air bag assembly incorporating adjustable tethering elements which are releasable from a first restrained condition to a second condition of extended operative length and which further facilitate the movement of the cushion in a downward direction during the early stages of inflation.

According to one aspect of the present invention, an air bag assembly is provided including at least two elongate tethering elements which are adjoined to one another by a break-away seam such that the tethering elements at least partially disengage from attachment to one another as pressure increases within the air bag cushion causing tension to increase across the break-away seam during the latter states of inflation. The attachment of the tethers to one another provides an enhanced degree of control over the deployment characteristics of the cushion during the early stages of inflation.

According to another aspect of the present invention an air bag assembly is provided including at least one tether in the form of a panel and at least one gas transmission opening across the interior of that panel. The panel is folded upon itself and seamed so as to close off the opening. Upon the application of tension within the panel exceeding a certain level, the seam holding the panel in folded condition undergoes at least partial disengagement such that the panel is extended to an increased operative length and the opening across the panel is at least partially exposed to facilitate the transmission of inflation gas into a lower portion of the cushion.

BRIEF DESCRIPTION OF THE DRAWINGS

The present invention will now be described by way of example only, with reference to the accompanying drawings which constitute a part of the specification herein and in which.

While the invention has been illustrated and will hereinafter be described in connection with certain exemplary embodiments, procedures and practices, it is to be understood that in no event is the invention to be limited to such illustrated and described embodiments, procedures and practices. On the contrary, it is intended that the present invention shall extend to all alternatives and modifications as may embrace the principles of this invention within the true spirit and scope thereof.

DESCRIPTION OF THE PREFERRED EMBODIMENT

Figure 1:
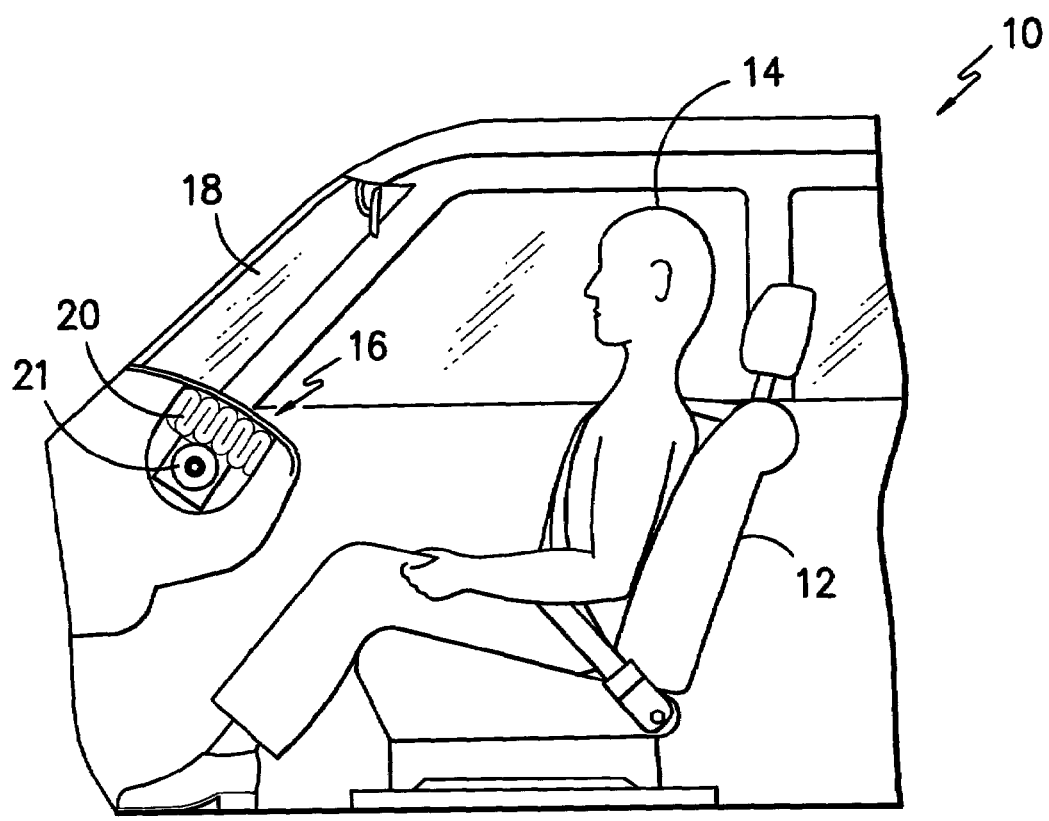
FIG. 1 is a cut-away view of a vehicle interior showing an air bag cushion in a stored undeployed state in opposing relation to a vehicle occupant.

Reference will now be made to the drawings, wherein to the extent possible, like reference numerals are utilized to designate like components through the various views. In FIG. 1 it is seen that a vehicle 10 may include a seating structure 12 which supports an occupant 14 in generally opposing relation to a dash panel 16. An inflatable air bag cushion 20 is housed within the dash panel 16 in fluid communication with a gas emitting inflator 21. Upon the emission of an inflation gas from the inflator 21, the air bag cushion 20 expands outwardly through an opening in the surface of the dash panel 16. As will be appreciated, in an unrestricted state the air bag cushion 20 will tend to inflate in a path generally away from the inflator 21 and along windshield 18 during the initial states of inflation. As inflation proceeds, the air bag cushion 20 fills out to its desired geometry and undergoes a degree of rotation downwardly so as to provide coverage between the dash panel 16 and the torso of the occupant 14.

Figure 2:
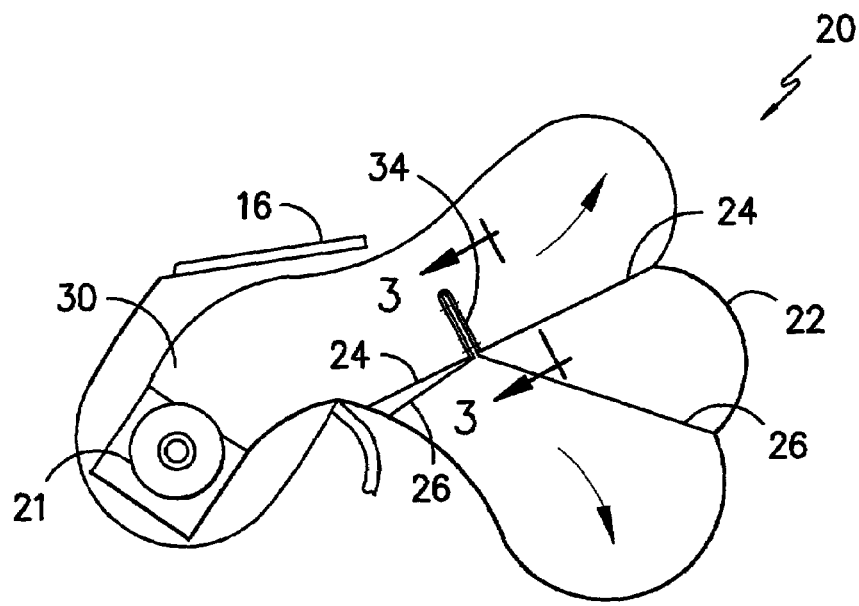
FIG. 2 is a cut-away side view of an air bag cushion incorporating two elongate tethers adjoined to one another by a break-away seam assembly.

In FIG. 2 a tethering arrangement for use at the interior of the air bag cushion 20 is illustrated. The exemplary tethering arrangement illustrated in FIG. 2 is believed to be useful in facilitating the downward rotation of the air bag cushion 20 at an early stage of inflation. In particular, the tethering arrangement illustrated is believed to move the axis of rotation for the air bag cushion 20 outwardly to a more rearward location relative to the vehicle 10 (i.e. towards the occupant 14) thereby causing a face portion 22 of the air bag cushion 20 to move downwardly at an early stage of inflation. As illustrated, the tethering arrangement incorporates a first shape defining tether 24 and at least a second shape defining tether 26. The tethers 24, 26 may be of any suitable construction and material including straps or webs of pliable materials such as textile fabrics, polymer films, and the like. Elongate straps of woven textile material such as nylon 6 and nylon 6, 6 may be preferred.

Figure 4:
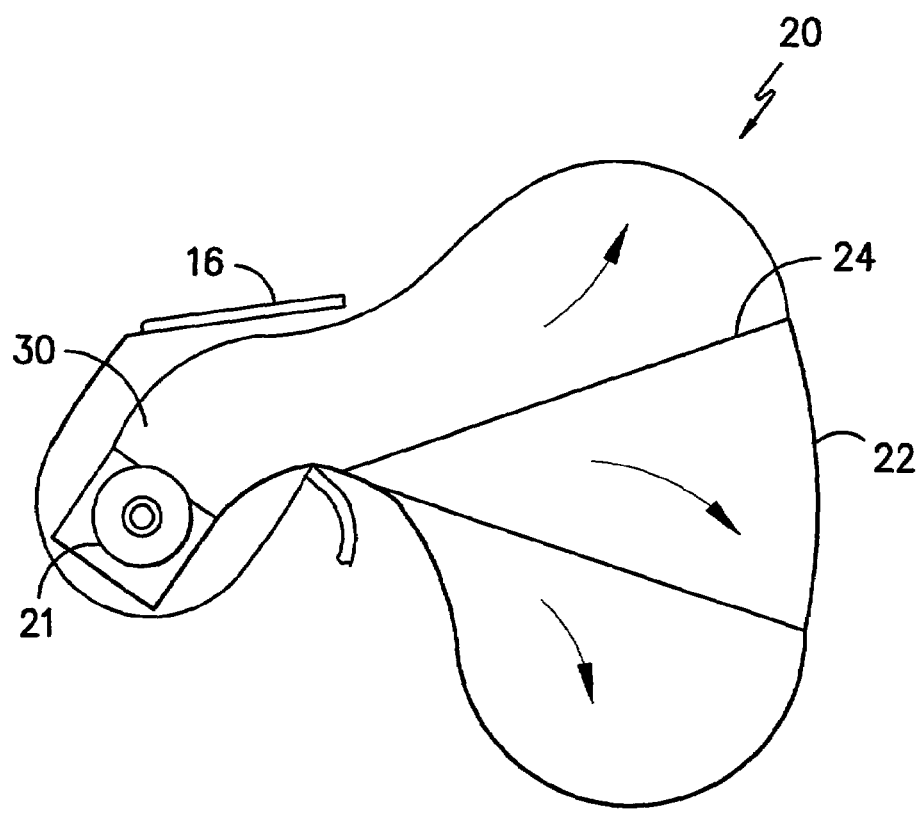
FIG. 4 is a view similar to FIG. 2 upon full inflation of the air bag cushion and disengagement of the break-away seam holding the tethers to one another.

As best illustrated in FIG. 4, in the absence of attachment between the tethers, the first shape defining tether 24 is normally disposed across the air bag cushion 20 in a path above the second shape defining tether 26. Thus, while the tethers 24, 26 may originate from the same point or closely adjacent points near the mouth portion 30 they extend to substantially divergent attachment points at different elevations near the face portion 22.

As illustrated, the tethers are connected to one another at a position rearward of a gas accepting mouth portion 30 which is held in position within the dash panel 16. This attachment position moves the axis of rotation for the air bag cushion 20 rearward away from the mouth portion 30. The attachment between the tethers 24, 26 is maintained by a break-away seam structure which separates as pressure is increased within the air bag cushion 20 resulting in increased tensioning forces being applied to the tethers 24, 26 as inflation proceeds. It is contemplated that the break-away seam structure holding the tethers 24, 26 together may be of various constructions including frangible sewn seams, adhesive seams, patterned welded seams, seams formed by the engagement of mateable fabrics such as VELCRO and the like. Thus, it is to be understood that by the term "break-away attachment seam" is meant any attachment which may initially hold the tethers 24, 26 to one another but which separates upon the achievement of adequate tensioning forces. Tear-away sewn seams may be particularly preferred.

Figure 3:
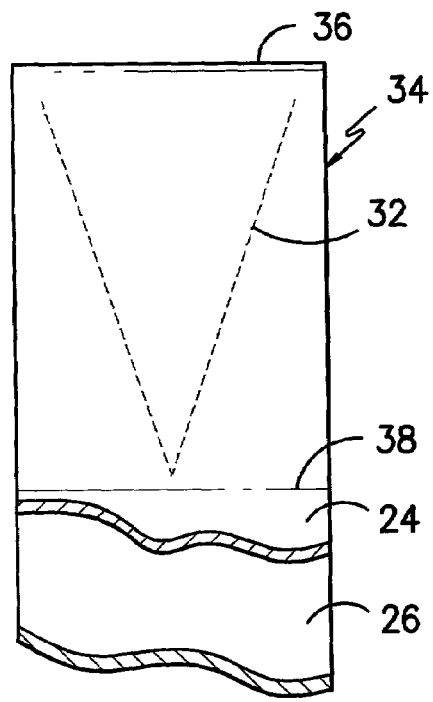
FIG. 3 is a view taken generally along line 3—3 in FIG. 2 illustrating a "V" shaped break-away seam arrangement for adjoining tethers to one another.

In FIG. 3 an exemplary seam structure in the form of a tear-away sewn seam 32 is illustrated. At shown, in this arrangement the tethers 24, 26 are formed into a multi-layer pleat structure 34. The pleat structure 34 has a closed end 36 with the tear-away sewn seam 32 projecting away from the closed end 36 towards the location of divergence 38 at which the tethers 24, 26 enter and leave the pleat structure. That is, the apex of the "V" shaped sewn seam 32 points away from the closed end 36 of the pleat structure 34 and towards the position where the tethers 24, 26 enter and leave the pleat structure 34.

During operation, as inflation gas is expelled from the inflator 20 and into the air bag cushion 20 through the mouth portion 30, inflation will proceed with expansion being initially limited by the tethers 24, 26 in the manner as illustrated in FIG. 2. As pressure builds, the system attempts to relieve stress by first rotating downwardly around a pivot point established by the pleat structure 34. As tension is increased still further during the latter stages of inflation, the tethers 24, 26 separate from one another within the pleat structure 34 with such separation commencing at the apex of the sewn seam 32. The separation then progresses towards the closed end of the pleat structure 34 until being completed. Full expansion is thereafter completed as illustrated in FIG. 4 with the tethers 24, 26 being maintained in tension across the interior of the air bag cushion 20. That is, the extended operative length of the tethers 24, 26 is preferably such that they provide a restraining force across the air bag cushion even after being extended.

As will be appreciated, while an arrangement of only two tethers 24, 26 has been illustrated for exemplary and explanatory purposes, it is likewise contemplated that any number of additional tethers or sets of tethers normally disposed along various paths at different elevations within the air bag cushion may be utilized if desired. As will be further appreciated, while the tethers 24, 26 have been illustrated as being formed into a multi-layer pleat structure so as to reduce the operative length prior to seam separation, it is also contemplated that the tethers 24, 26 may be attached to one another without being folded into a pleat structure. In such an arrangement an operative shortening will still be effected by pulling one or both tethers away from a straight line orientation in order to achieve the attachment.

An alternative exemplary embodiment of an air bag cushion incorporating a break-away seam structure within a tethering element is illustrated in FIGS. 5–9. In these figures, like components to those previously illustrated and described are designated by like reference numerals increased by 100. As best illustrated through simultaneous reference to FIGS. 5–7, the assembly includes a panel tether 140 extending between surface portions of the air bag cushion 120 so as to substantially restrain the face portion 122 during the early stages of inflation. The panel tether which may be formed of any suitable material including polymeric films, textile fabrics, and the like extends partially across the width of the air bag cushion 120 at an elevation below the mouth portion 130 (FIG. 7) so as to permit the restricted passage of inflation gas from an upper chamber 144 into a lower chamber 146 around the lateral sides of the panel tether 140 during the early stages of inflation. The panel tether 140 also includes at least one interior gas transmission opening 150 which is closed off during the initial stages of inflation (FIG. 5) and which is open during the latter stages of inflation (FIG. 6) so as to increase the flow-through area between the upper chamber 144 and the lower chamber 146 during such latter stages.

Figure 5:
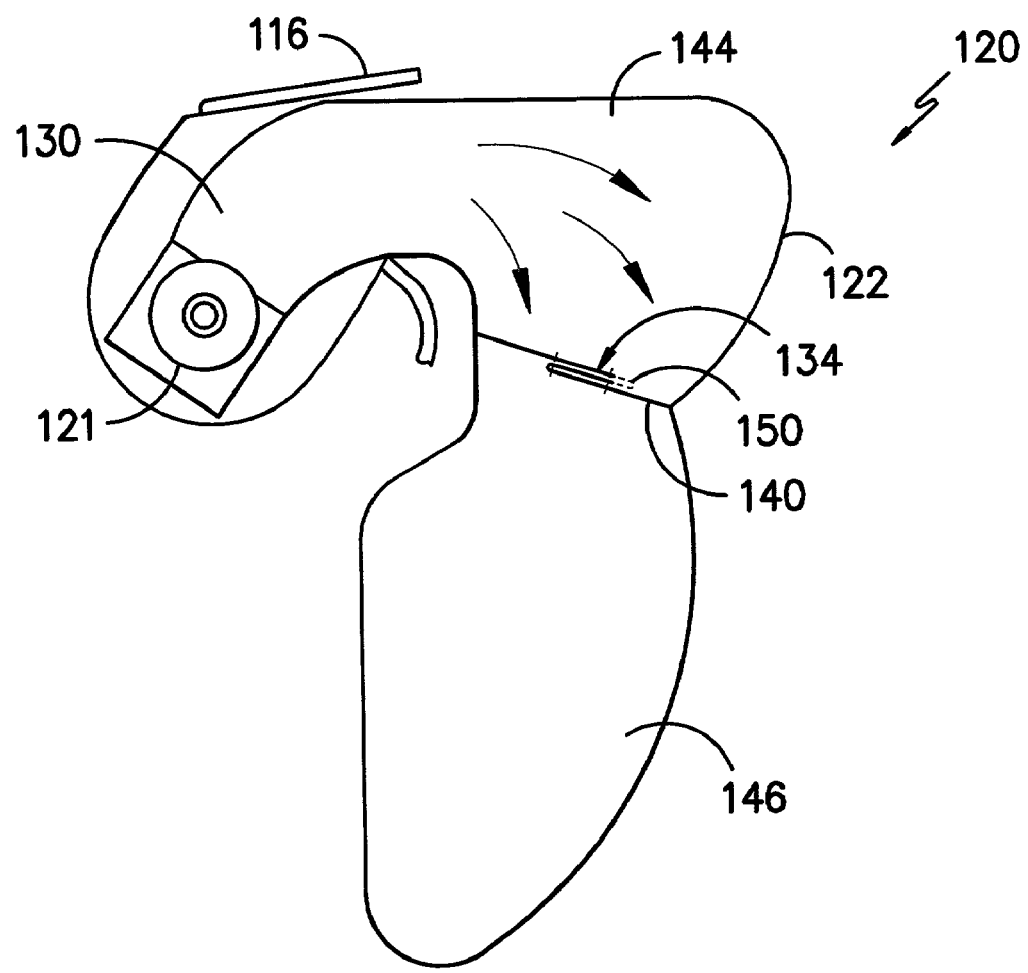
FIG. 5 is a cut-away side view of an air bag cushion including a panel tether held in a shortened folded condition by a break-away seam arrangement.
Figure 7:
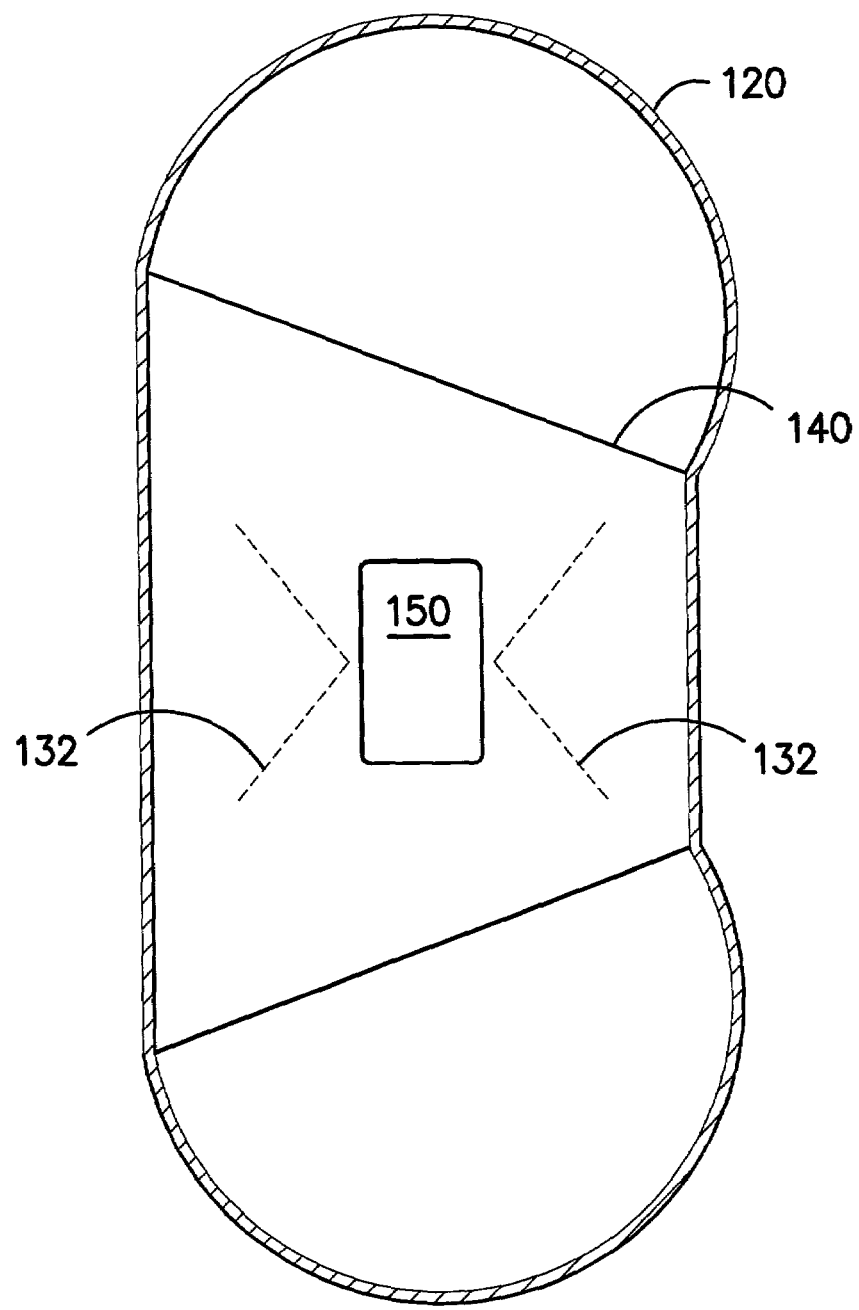
FIG. 7 is a plan view of an exemplary panel tether within an air bag cushion having an opening therein and showing seam lines for introduction of a break-away seam when the tether is in a folded condition.
Figure 8:
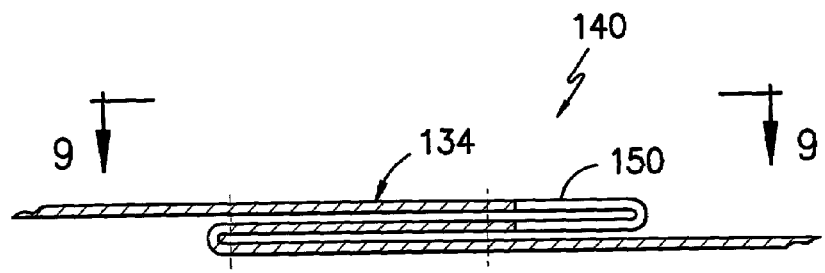
FIG. 8 is an enlarged side view of a panel tether folded and seamed to close off an opening within the panel tether.

As best illustrated by simultaneous reference to FIGS. 5, 7 and 8, in practice, the panel tether 140 is folded upon itself so as to form a multi-layer gas blocking pleat structure 134 closing off the interior gas transmission opening 150. In addition, the pleating reduces the operative length of the panel tether 140 so as to restrain the outward projection of the face portion 122. Thus, during the early stages of inflation when the panel tether 140 is held in the restrained condition blocking the interior gas transmission opening 150, the flow of inflation gas from the upper chamber 144 into the lower chamber 146 is reduced.

Figure 6:
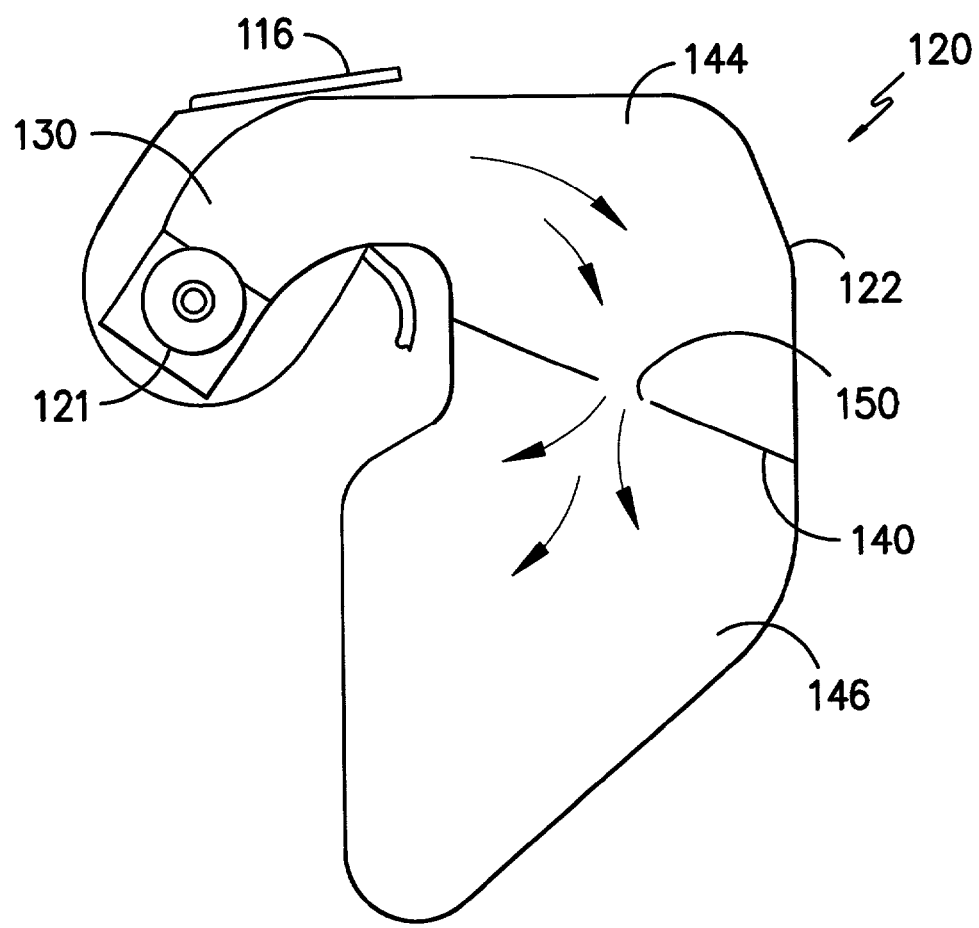
FIG. 6 is a view similar to FIG. 5 illustrating the air bag cushion in a fully deployed condition following rupture of the break-away seaming arrangement and extension of the panel tether showing gas passage through an opening at the interior of the panel tether.
Figure 9:
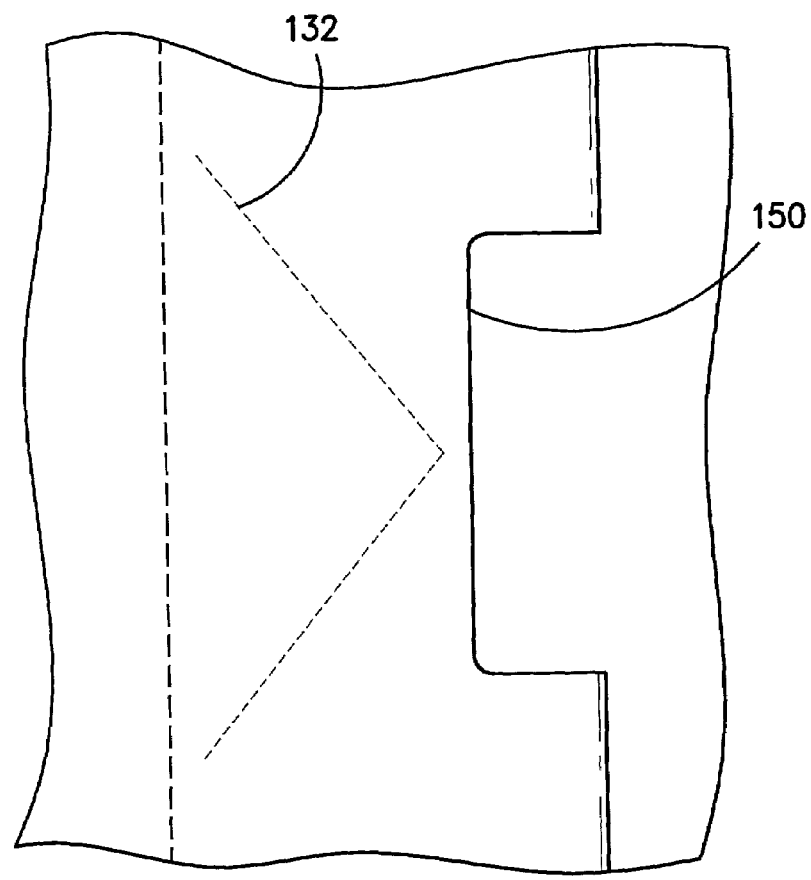
FIG. 9 is a view taken generally along line 9—9 in FIG. 8 illustrating the folded seamed arrangement.

The gas blocking pleat structure 134 is maintained by a break-away attachment seam which separates upon the introduction of an adequate tensioning force across the panel tether 140. By way of example only, and not limitation, one contemplated seaming arrangement is illustrated in FIGS. 7 and 9. As illustrated, in this arrangement a tear-away sewn seam 132 is introduced through the pleat structure 134 in a substantially "V" shaped pattern having an apex projecting towards the interior gas transmission opening 150. Upon the application of a tensioning force across the panel tether 140, the seam 132 is caused to gradually separate beginning at the apex of the tear-away sewn seam thereby extending the operative length of the panel tether 140 and opening the interior gas transmission opening 150 to a configuration as illustrated in FIGS. 6 and 7.

While the panel tether 140 has been illustrated as incorporating a single gas transmission opening 150, it is, of course, anticipated that the panel tether 140 may incorporate a plurality of such openings if desired. Likewise, it is to be understood that a number of such panel tethers which are maintained either independently or which are seamed together may likewise be utilized if desired.

The introduction of break-away attachment seam structures at locations substantially rearward of the mouth opening 130 in the air bag cushion 120 provides a mechanism for the controlled manipulation of cushion kinematics during deployment. In particular, such break-away seam structures permit the early and controlled rotation of the air bag cushion into a downward position and away from the windshield so as to provide early stage coverage across lower portions of the instrument panel.

It is contemplated that the concepts of the present invention are adaptable to virtually any tethering arrangement including the use of tethers which are secured in place within an inflator housing as well as those which are secured to portions of the air bag cushion itself. Accordingly, it is to be understood that while the invention has been illustrated and described in relation to certain exemplary embodiments, constructions, and procedures, that such embodiments, constructions, and procedures are illustrative only and that the present invention is in no event to be limited thereto. In particular, it is to be understood that the present invention is in no way limited to any particular arrangement of tethering elements within the cushion and that all illustrations and/or descriptions of such arrangements are explanatory and exemplary only. It is therefore contemplated and intended that the present invention shall extend to all such configurations as may incorporate the broad principles of the present invention within the full spirit and scope thereof.

The invention claimed is:

1. An automotive air bag assembly comprising:
   an inflatable air bag cushion including a mouth portion in fluid communication with a gas emitting inflator;
   a first shape restricting tethering element disposed within the air bag cushion and extending across an interior portion of the air bag cushion; and
   at least a second shape restricting tethering element disposed within the air bag cushion and extending across an interior portion of the air bag cushion, wherein at least a portion of the second shape restricting tethering element is disposed below the first shape restricting tethering element when the air bag cushion is in a fully inflated condition and wherein the first shape restricting tethering element is releaseably attached to the second shape restricting tethering element by a break-away attachment seam such that the second shape restricting element has an operative length greater than the first shape restricting tethering element,
   wherein the break-away attachment seam is adapted to secure the first shape restricting tethering element to the second shape restricting tethering element at pressures within the air bag cushion below a predefined level during initial inflation of the air bag cushion and forms a pivot location to cause the air bag cushion to rotate downwardly during the initial inflation of the air bag cushion; and
   wherein the break-away attachment seam is adapted to separate upon the development of a pressure within the air bag cushion exceeding said predefined level following initial inflation such that the first shape restricting tethering element is disengaged from the second shape restricting tethering element at the location of the break-away attachment seam following initial inflation, and
   wherein said first and second shape restricting tethering elements extend longitudinally between forward and rearward attachment locations such that upon deployment of the air bag cushion said first and second shape restricting tethering elements extend substantially towards an occupant to be protected.

2. The assembly according to claim 1, wherein the first shape restricting tethering element and the second shape restricting tethering element have extended operative lengths following disengagement such that tension is maintained within the first shape restricting tethering element and the second shape restricting tethering element when the air bag cushion is fully inflated.

3. The assembly according to claim 1, wherein the first shape restricting tethering element and the second shape restricting tethering element comprise elongate straps.

4. The assembly according to claim 3, wherein said elongate straps comprise textile fabric.

5. The assembly according to claim 3, wherein at least one of the first shape restricting tethering element and the second shape restricting tethering element is operatively attached to an impact face portion of the air bag cushion so as to contour the shape of the impact face portion during inflation.

6. The assembly according to claim 1, wherein upon deployment of the air bag cushion said first and second shape restricting tethering elements are disposed in non-parallel angled relation to one another.

7. An automotive air bag assembly comprising:
an inflatable air bag cushion including a mouth portion in fluid communication with a gas emitting inflator;
a first shape restricting tethering element disposed within the air bag cushion and extending across an interior portion of the air bag cushion; and
at least a second shape restricting tethering element disposed within the air bag cushion and extending across an interior portion of the air bag cushion, wherein at least a portion of the second shape restricting tethering element is disposed below the first shape restricting tethering element when the air bag cushion is in a fully inflated condition and wherein the first shape restricting tethering element is releaseably attached to the second shape restricting tethering element by a break-away attachment seam such that the second shape restricting element has an operative length greater than the first shape restricting tethering element;
wherein the break-away attachment seam is adapted to secure the first shape restricting tethering element to the second shape restricting tethering element at pressures within the air bag cushion below a predefined level during initial inflation of the air bag cushion and is disposed within the interior portion of the air bag cushion substantially rearward of the mouth portion to cause the air bag cushion to rotate downwardly during said initial inflation of the air bag cushion; and
wherein the break-away attachment seam is adapted to separate upon the development of a pressure within the air bag cushion exceeding said predefined level following initial inflation such that the first shape restricting tethering element is disengaged from the second shape restricting tethering element at the location of the break-away attachment seam following initial inflation, and
wherein said first and second shape restricting tethering elements extend longitudinally between forward and rearward attachment locations such that upon deployment of the air bag cushion said first and second shape restricting tethering elements extend substantially towards an occupant to be protected.

8. The assembly according to claim 7, wherein the first shape restricting tether element and the second shape restricting tether element form a multi-layer pleat structure at the attachment location and wherein the break-away attachment seam comprises a substantially "V" shaped attachment seam extending through layers of the pleat structure.

9. The assembly according to claim 8, wherein the substantially "V" shaped attachment seam is oriented within the pleat structure such that upon development of pressure within the air bag cushion exceeding said predefined level the "V" shaped attachment seam undergoes progressive separation commencing at the apex of the "V" shaped attachment seam.

10. The assembly according to claim 7, wherein upon deployment of the air bag cushion said first and second shape restricting tethering elements are disposed in non-parallel angled relation to one another.

11. An automotive air bag assembly comprising:
an inflatable air bag cushion including a mouth portion in fluid communication with a gas emitting inflator;
a first shape restricting tethering element comprising an elongate strap disposed within the air bag cushion and extending across an interior portion of the air bag cushion; and
at least a second shape restricting tethering element comprising an elongate strap disposed within the air bag cushion and extending across an interior portion of the air bag cushion, wherein at least a portion of the second shape restricting tethering element is normally disposed below the first shape restricting tethering element when the air bag cushion is in a fully inflated condition, wherein said first and second shape restricting tethering elements extend longitudinally between forward and rearward attachment locations such that upon deployment of the air bag cushion said first and second shape restricting tethering elements extend substantially towards an occupant to be protected; and
wherein the first shape restricting tethering element is releaseably attached to the second shape restricting tethering element by a break-away attachment seam such that the second shape restricting element has an operative length greater than the first shape restricting tethering element, the break-away attachment seam being adapted to secure the first shape restricting tethering element to the second shape restricting tethering element at pressures within the air bag cushion below a predefined level during initial inflation of the air bag cushion and being disposed at an attachment location within the interior portion of the air bag cushion substantially rearward of the mouth portion to form a pivot to cause the air bag cushion to rotate downwardly during initial inflation of the air bag cushion; and
wherein the break-away attachment seam is adapted to separate upon the development of a pressure within the air bag cushion exceeding said predefined level following initial inflation such that the first shape restricting tethering element is disengaged from the second shape restricting tethering element at the location of the break-away attachment seam following initial inflation; and
wherein the first shape restricting tether element and the second shape restricting tether element form a multi-layer pleat structure at the attachment location and wherein the break-away attachment seam comprises a substantially "V" shaped attachment seam oriented vertically within the pleat structure extending through layers of the pleat structure.

12. The assembly according to claim 11, wherein the first shape restricting tethering element and the second shape restricting tethering element have extended operative lengths following disengagement from one another such that tension is maintained within the first shape restricting tethering element and the second shape restricting tethering element when the air bag cushion is fully inflated.

13. The assembly according to claim 11, wherein said elongate straps comprise textile fabric.

14. The assembly according to claim 11, wherein at least one of the first shape restricting tethering element and the second shape restricting tethering element is operatively attached to an impact face portion of the air bag cushion so as to contour the shape of the impact face portion during inflation.

15. The assembly according to claim 11, wherein the substantially "V" shaped attachment seam is oriented within the pleat structure such that upon development of pressure within the air bag cushion exceeding said predefined level the "V" shaped attachment seam undergoes progressive separation commencing at the apex of the "V" shaped attachment seam.

16. The assembly according to claim 11, wherein upon deployment of the air bag cushion said first and second shape restricting tethering elements are disposed in non-parallel angled relation to one another.

* * * * *